United States Patent [19]

Garrou

[11] Patent Number: 5,677,521
[45] Date of Patent: Oct. 14, 1997

[54] PERSONAL IDENTIFICATION AND CREDIT INFORMATION SYSTEM AND METHOD OF PERFORMING TRANSACTION

[76] Inventor: Elizabeth B. Garrou, 405 Louise Ave., Valdese, N.C. 28690

[21] Appl. No.: 496,738

[22] Filed: Jun. 29, 1995

[51] Int. Cl.[6] .................................................. G06F 17/00
[52] U.S. Cl. ........................... 235/375; 235/380; 235/492
[58] Field of Search ..................................... 235/375, 380, 235/492

[56] References Cited

U.S. PATENT DOCUMENTS

| | | |
|---|---|---|
| 1,383,104 | 6/1921 | Grossman . |
| 3,702,464 | 11/1972 | Castrucci . |
| 3,971,916 | 7/1976 | Moreno . |
| 4,004,133 | 1/1977 | Hannan et al. . |
| 4,007,355 | 2/1977 | Moreno . |
| 4,105,156 | 8/1978 | Dethloff . |
| 4,354,189 | 10/1982 | Lemelson . |
| 4,404,464 | 9/1983 | Moreno . |
| 4,488,370 | 12/1984 | Lemelson . |
| 4,539,472 | 9/1985 | Poetker et al. . |
| 4,598,275 | 7/1986 | Ross et al. . |
| 4,984,683 | 1/1991 | Eller . |
| 4,996,411 | 2/1991 | Rebjock . |
| 5,012,299 | 4/1991 | Lennon et al. . |
| 5,027,190 | 6/1991 | Haghiri-Tehrani et al. . |
| 5,062,232 | 11/1991 | Eppler . |
| 5,193,360 | 3/1993 | Lovegrove . |
| 5,218,344 | 6/1993 | Ricketts et al. ............... 350/573 |
| 5,266,783 | 11/1993 | McAllister . |
| 5,337,290 | 8/1994 | Ventimiglia et al. . |

Primary Examiner—Harold Pitts
Attorney, Agent, or Firm—Bell, Seltzer, Park & Gibson, P.A.

[57] ABSTRACT

A personal identification and credit information system and a method of performing a transaction are provided for reducing inconveniences associated with using identifications, credit cards, debit cards, or the like when a user engages in purchase, credit, or banking transactions. The personal identification and credit information system preferably includes a ring arranged for inserting a finger of a user therethrough. The ring preferably has a memory device mounted to the ring for storing data therein. The ring preferably has a storage chamber connected to an outer surface of the ring for positioning the memory device therein. The memory device preferably includes a personal identification and credit data file having personal identification and credit data stored in a predetermined format in the personal identification and credit data file. A communicator preferably is electrically connected to the memory device for communicating personal identification and credit data to and from the personal identification and credit data file of the memory device. The system also preferably includes a scanner arranged to be positioned adjacent the communicator of the ring and in electrical communication therewith for receiving personal identification and credit data from the personal identification and credit data file of the memory device to thereby responsively determine whether to authorize a transaction.

11 Claims, 4 Drawing Sheets

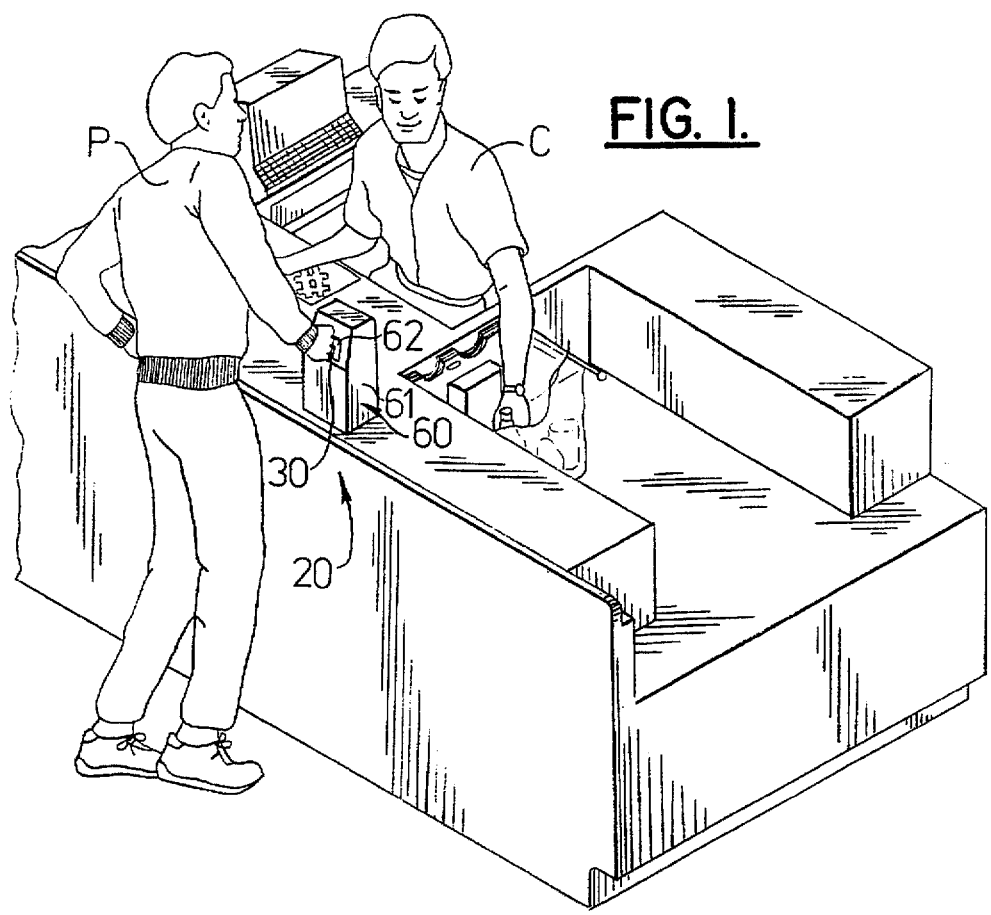
FIG. 1.
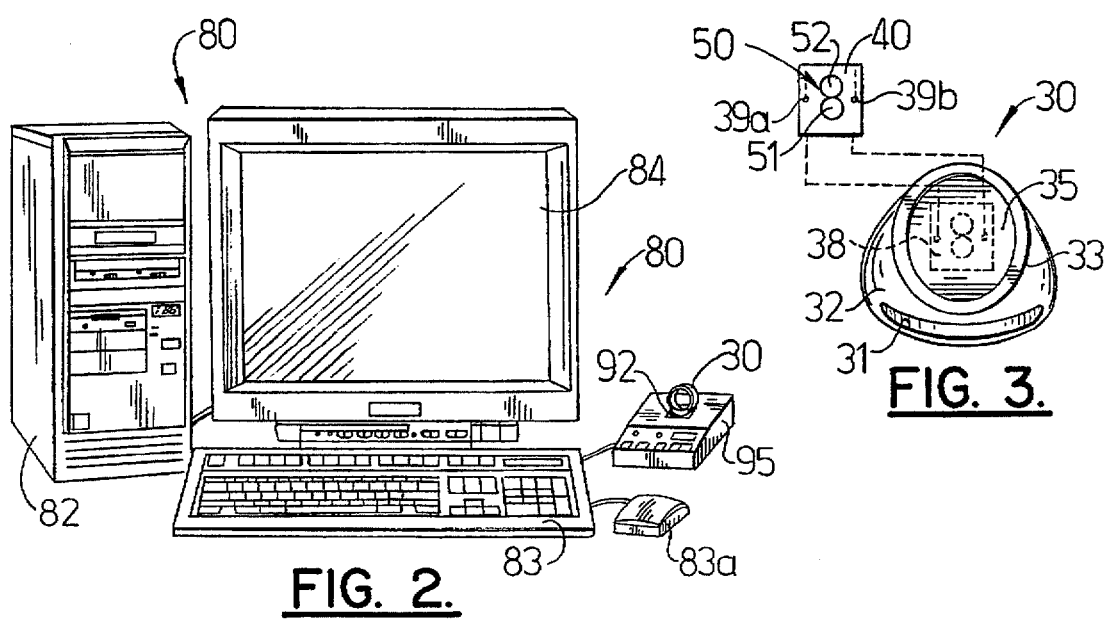
FIG. 2.
FIG. 3.

5,677,521

PERSONAL IDENTIFICATION AND CREDIT INFORMATION SYSTEM AND METHOD OF PERFORMING TRANSACTION

FIELD OF THE INVENTION

This invention relates generally to information systems and, more particularly, to a personal identification and credit information system for communicating personal and/or credit information such as to a retail store clerk, bank, or the like.

BACKGROUND OF THE INVENTION

When purchasing an item in a retail store, a customer often desires to pay for the purchase by credit or by writing a check for the amount of the item. Before a purchasing transaction is completed, however, the customer is often required to display various types of identification and/or credit worthiness information, such as an existing credit card or drivers license, to the store clerk. Despite this display of information, often credit data related to a credit card of the purchaser or a check of the purchaser is also processed for verifying whether to proceed with a transaction.

Credit verification information systems have been developed to assist in performing these purchase transactions. These credit verification information systems conventionally include a credit card having a magnetic stripe with coded information thereon and a credit card reader arranged for reading or sensing the magnetic stripe of the credit card. These systems may also include a check verification system where a checking account number is entered into the system and the system verifies whether the account number is in good standing. Other systems include debit cards which debit the amount of purchase from a customers checking account to complete the purchase transaction. Additionally, so-called "smart" cards have been developed, such as described in U.S. Pat. No. 4,996,411 by Rebjock titled "Method Of Manufacturing A Card Having Electronic Memory And A Card Obtained By Performing Said Method," U.S. Pat. No. 4,007,355 by Moreno titled "Data-Transfer System," and U.S. Pat. No. 4,004,133 by Hannan et al. titled "Credit Card Containing Electronic Circuit," which allow data related to a credit transaction to be conducted and recorded by use of the card.

These conventional credit verification information systems, however, often require a person to fumble through a purse or wallet for a credit card, a debit card, a drivers license, a personal identification, a check, or other items to complete a purchase transaction and/or verify whether a purchasing transaction or other type of transaction should be completed. This, for example, may require the purchaser to drop packages or other items being carried and may substantially slow down the purchase transaction process. Additionally, purchasers often misplace or forget to carry required credit cards, debit cards, identifications, checks, and the like which makes the purchase transaction difficult, if not impossible. Further, errors occur in transferring information about the purchaser, such as a drivers license number or telephone number, to a check for later reference.

OBJECTS AND SUMMARY OF THE INVENTION

With the foregoing in mind, it is an object of the present invention to provide a personal identification and credit information system for reducing inconveniences associated with using personal identifications and/or credit cards when a person engages in purchase transactions.

It is also an object of the present invention to provide a method of performing a purchase transaction to thereby verify authorization whether to proceed with the purchase transaction.

The present invention advantageously includes personal identification, credit, and/or other personal data within a ring so that credit or other personal data about the wearer of the ring can readily be withdrawn from the ring for completing a purchase transaction. This, for example, prevents the user from having to carry other identification, credit cards, or the like to a retail store to complete a purchase of an item or to a bank for personal identification. The personal credit information system thereby provides convenience to the wearer of the ring so that fumbling through a purse or wallet for identification, credit cards, or the like is not required. A retail clerk also will not be required to manually transfer information about a purchaser to a check or to manually enter the information into a credit verification system or the like. The personal credit information system advantageously can be used to purchase items, can be used in combination with checks, credit cards, or the like as a personal identification system, and/or can be used to verify credit worthiness for completing a purchase transaction, a credit transaction, or other identification transaction.

More particularly, the personal credit information system preferably includes a ring arranged for inserting a finger of a user therethrough. The ring preferably has a memory device mounted on the ring for storing data therein. The ring also preferably has a storage chamber connected to the ring for mounting the memory device therein. The memory device preferably includes a personal identification and credit data file having personal identification and credit data stored in a predetermined format in the personal identification and credit data file. A communicator is positioned in electrical communication with the memory device for communicating personal identification and credit data to and from the personal identification and credit data file of the memory device. The system also includes means, such as a credit data scanner, arranged to be positioned adjacent the communicator of the ring and in electrical communication therewith for receiving personal identification and credit data from the credit data file of the memory device to thereby responsively determine whether to authorize or proceed with the purchase transaction.

The present invention also includes a method of performing a purchase transaction. The method preferably includes positioning a ring which includes a memory device having personal identification credit data therein closely adjacent a scanner and receiving the personal identification and credit data to the scanner from the memory device of the ring to thereby verify authorization for proceeding with a purchase transaction.

BRIEF DESCRIPTION OF THE DRAWINGS

Other objects and advantages will appear as the description proceeds when taken in connection with the accompanying drawings, in which:

FIG. 1 illustrates an environmental view of a personal identification and credit information system according to a first embodiment of the present invention;

FIG. 2 illustrates an environmental view of a personal identification and credit information system according to a second embodiment of the present invention;

FIG. 3 schematically illustrates a first embodiment of a ring of a personal identification and credit information system according to the present invention;

DETAILED DESCRIPTION

Figure 4:
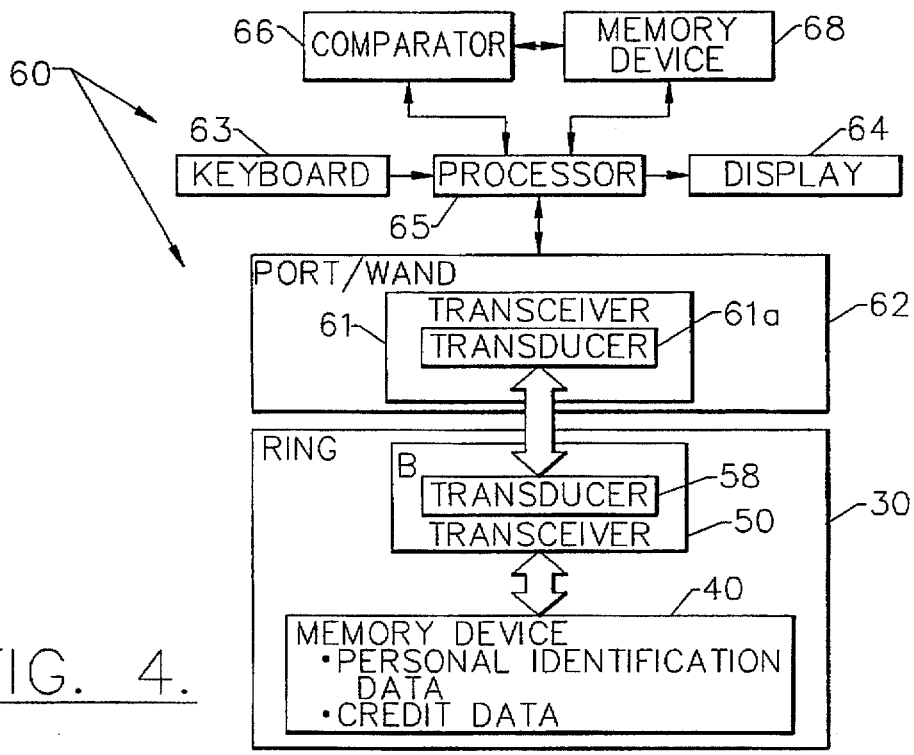
FIG. 4 schematically illustrates a personal identification and credit information system according to a first embodiment of the present invention.

The present invention now will be described more fully hereinafter with reference to the accompanying drawings in which preferred embodiments of the invention are shown. This invention may, however, be embodied in many different forms and should not be construed as limited to the illustrated embodiments set forth herein; rather, these illustrated embodiments are provided so that this disclosure will be thorough and complete and will fully convey the scope of the invention to those skilled in the art. Like numbers refer to like elements throughout.

FIG. 1 illustrates an environmental view of a personal identification and credit information system 20 according to the present invention for reducing inconveniences associated with using driver licenses or other personal identification and/or credit cards when a user engages in purchase transactions. The personal identification and credit information system 20 preferably has at least two main components, namely a ring 30 and means, i.e., a scanner 60, arranged to communicate with the ring 30 for communicating personal identification and credit information from the ring 30 to the scanner 60. FIG. 1 illustrates a purchaser P or user with a ring 30 positioned on a finger standing at a check-out counter of a retail store and includes a cashier or clerk C, a "cash register" or terminal/scanner type system wherein the purchaser having the ring 30 places the ring 30 into a port-type area 62 located in a housing of the scanner 60 so as to transmit the personal identification and credit information to the scanner 60 for display to the clerk C.

FIG. 3 illustrates an enlarged view of the ring 30, i.e., a signet type ring, having a storage chamber 35 in the head 33 of the ring 30 in which an integrated circuit or other memory device 40, such as an add-only or write-only memory device, a read only memory ("ROM") device, or an erasable programmable read only memory ("EPROM") device, as understood by those skilled in the art, would be mounted. It will also be understood that according to the present invention a storage chamber 35 may include encapsulating all or a portion of the memory device 40 by an epoxy, polymeric materials, or materials and means for protecting, mounting, and/or securing the memory device 40 to the ring 30. The ring 30 preferably would also include electrical contact pins 39a, 39b or some other communication means 50 connected to the memory device 40 for transmitting and receiving personal identification and credit data. The ring 30 as illustrated in FIG. 1 preferably is arranged for inserting a finger of a purchaser P or user therethrough. The ring 30 includes an inner surface 31 for abuttingly contacting the finger when positioned on the finger of the purchaser P and an opposing outer surface 32. A storage chamber 35 is connected to, and preferably is integrally formed with the outer surface 32 of the ring 30. The memory device 40, i.e. a first memory device, preferably is detachably mounted within the storage chamber 35 for storing data therein. The memory device 40 preferably is a miniaturized or reduced-size integrated circuit, i.e., add-only memory, ROM, or EPROM, such as used with surface mount technology and detachably mounts to a socket 38, i.e., surface mount type socket, mounted to a PC board B. The first memory device 40 preferably has a combination of a personal identification and credit data file 45, or separate personal identification data file and credit data file, having personal identification and credit data stored in a predetermined format in the credit data file (See FIG. 8.)

Figure 8:
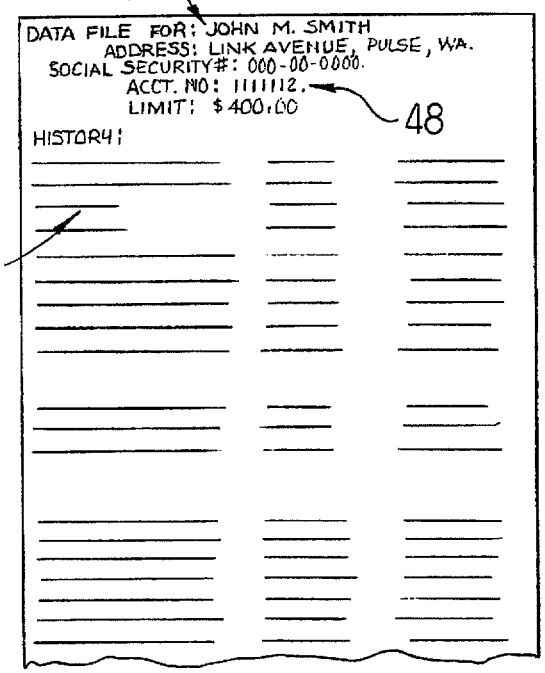
FIG. 8 illustrates a fragmentary view of a personal identification and credit data file of a personal identification and credit information system according to the present invention.

As best illustrated in FIG. 8, the contents of the personal identification and credit data file 45 preferably include the name of the wearer or purchaser P, the social security number, the mailing address, the relevant account number, and for the credit history/limit/information of the wearer or purchaser P. As understood by those skilled in the art and in the spirit and scope of the present invention, other various types of data about the user such as telephone number, home address, medical and health information may be included in the personal identification and credit data file 45. The predetermined format as illustrated preferably includes a plurality of data fields 48 which organize the data in a user friendly format so that the data may readily be printed on paper to a printer in communication with the scanner or the memory device of the ring. The format may also be viewed on a display screen for either a wearer of the ring, i.e., purchaser, a retail store clerk, a bank teller, an attendant programming the ring with personal and/or credit information, or the like.

Figure 5:
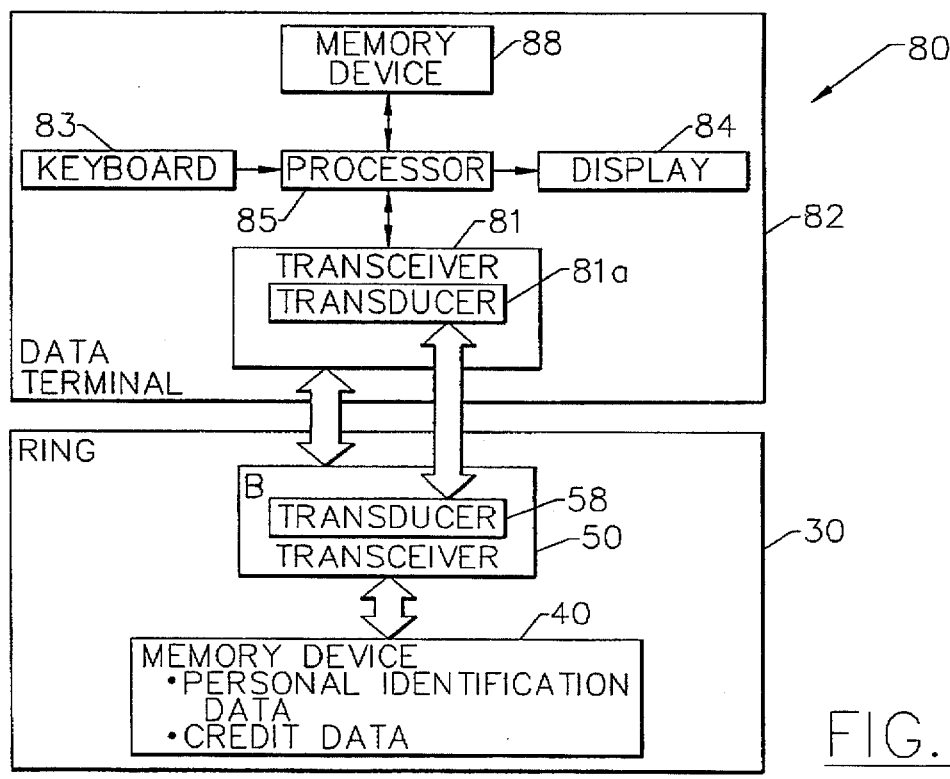
FIG. 5 schematically illustrates a personal identification and credit information system according to a second embodiment of the present invention.

As best illustrated in FIGS. 4 and 5, the ring 30 of the present invention preferably further has means 50, i.e., a transceiver or transmitter 51 and receiver 52, positioned in electrical communication with the memory device 40, i.e., mounted on a PC board B and electrically connected to the memory device 40. More particularly the personal identification and credit data file 45 of the memory device 40, for communicating the personal identification credit data to and transmitting the personal identification and credit data from the personal identification and credit data file 45 of the first memory device 40.

Figure 7:
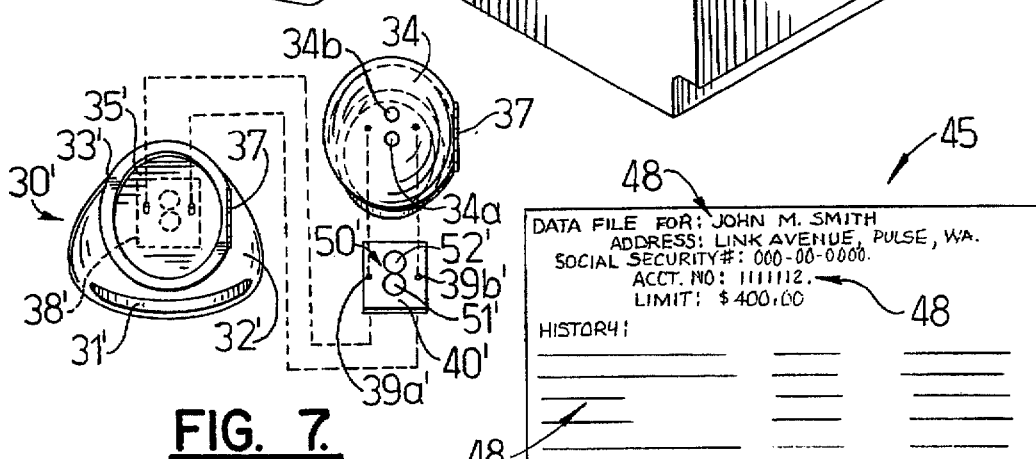
FIG. 7 schematically illustrates another embodiment of a ring of a personal identification and credit information system according to the present invention.

As best illustrated in another embodiment of the ring 30' in FIG. 7, the ring 30' may include the protective cover 34 positioned so as to overlie the memory device 40'/storage chamber 35'. Like elements in this embodiment are designated with prime (') notation. The protective cover 34 preferably is either removably or pivotally mounted by a hinge member 37 connected to the storage chamber 35' and the cover 34' for protecting the memory device 40 positioned in the storage chamber 35. The protective cover 34 includes at least one, and preferably two, data communications port 34a, 34b positioned in the cover 34 and through which the memory device 40' communicates the personal identification and credit data to the scanner 60.

The personal identification and credit information system 20 of the present invention preferably further includes a scanner 60, or scanner system, arranged to be positioned adjacent the transceiver 50 of the ring 30 and in electrical communication therewith for receiving personal identification and credit data from the personal identification and credit data file 45 of the first memory device 40. As best illustrated in FIG. 4, the scanner 60 preferably has a transceiver 61 including a transducer 61a, i.e., optical detector, arranged to receive communications from the first memory device 40 representative of personal identification and/or credit data and to responsively form electrical signals representative of the received personal identification and credit data. A processor 65 is positioned in electrical communication with the transducer 61a for processing the electrical signals representative of personal identification and credit data received by the transducer 61 from the first memory device 40 of the ring 30. A second memory device 68 is positioned in electrical communication with the processor 65 for storing data representative of a purchase transaction, such as price, quantity, and item identification. A comparator 66 is positioned in electrical communication with the processor 65, and also preferably the second memory device 68, for comparing the personal identification and credit data to the purchase transaction data to thereby responsively determined whether to authorize or proceed with the purchase transaction. The scanner 60 also preferably has a user interface such as a keyboard 63 for data entry and/or responsive interaction with a user. The scanner 60 also preferably has a display screen 64 such as a liquid crystal or cathode ray tube type display.

Figure 6:
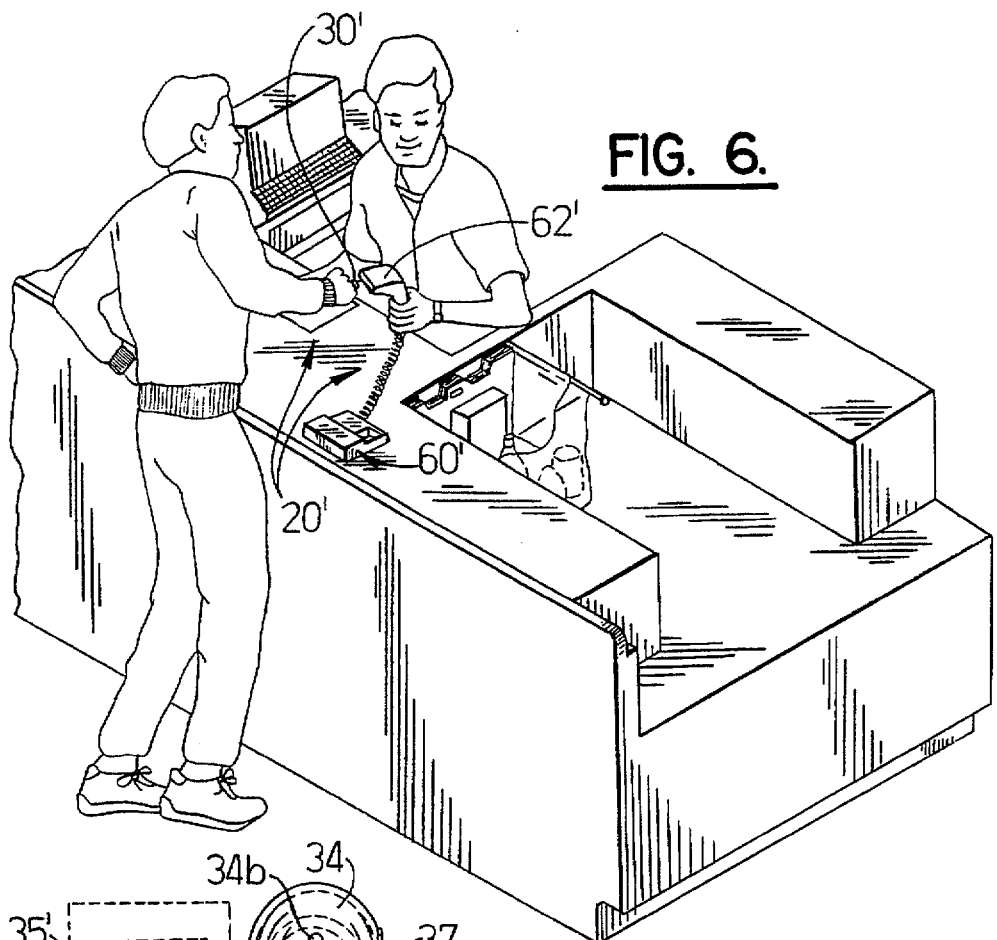
FIG. 6 schematically illustrates a personal identification and credit information system according to a third embodiment of the present invention.

FIG. 6 illustrates a personal identification and credit information system having a second embodiment of a communication receiving means or scanner 60', including the use of a "wand" 62' or a scanning head 62' instead of a port 62, for receiving the ring's transmitting/receiving means 50 to flexibly position adjacent the ring 30 to receive/transmit data to and from the ring 30. In this embodiment, like elements also are designated with prime (') notation. This embodiment of the system 20 preferably, for example, enables the retail store clerk or other personnel to mount the scanner in a different position with respect to the area where a purchaser approaches a check-out counter.

As best illustrated in FIGS. 2 and 5, the personal identification and credit information system 20 according to the invention preferably further includes a personal identification and credit data entry interface 80 for transmitting the personal identification and credit data to the first memory device 40 for storage therein. The personal identification and credit data entry interface 80 preferably has a data terminal or computer 82 including a keyboard 83, a processor 85 in electrical communication with the keyboard 8391 for processing the personal identification and credit data, and a third memory device 88 in electrical communication with the processor 88 for storing the entry of the personal identification and credit data such as from the keyboard 83. A ring interface 95 including a transmitter 81 is positioned in electrical communication with the processor 85 and the third memory device 88 for transmitting the personal identification and credit data. A port 92 is positioned closely adjacent the transceiver 81 for positioning the first memory device 40 and/or the upper portion of the ring 30 therein so as to transmit personal identification and credit data from the third memory device 88 to the first memory device 40, i.e., programming, for storage therein.

Figure 9:
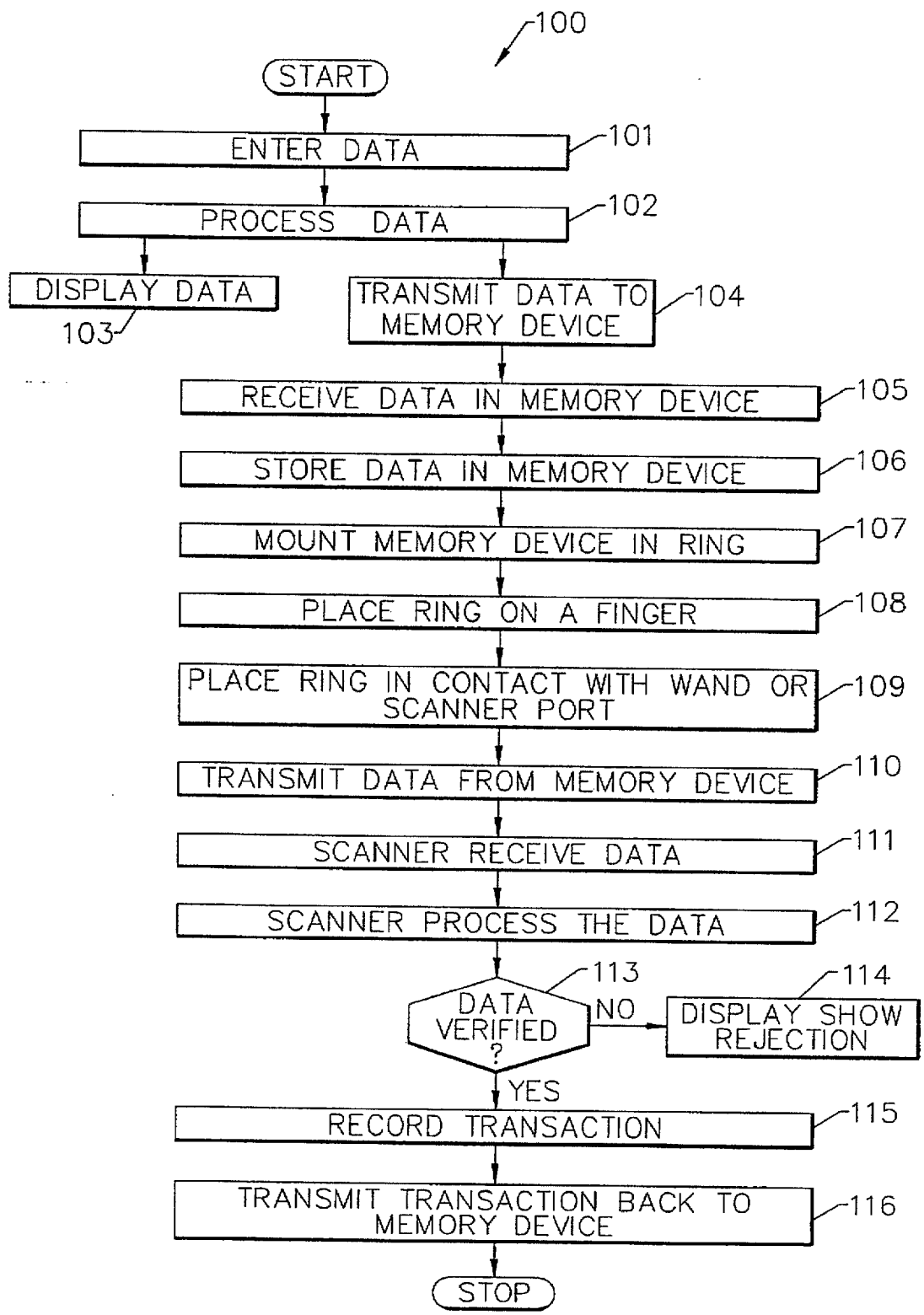
FIG. 9 schematically illustrates a method of communicating personal identification and credit information for performing a purchase transaction according to the present invention.

FIG. 9 schematically illustrates methods 100 for communicating personal and credit data of a purchaser or user thereof to a ring 30 from the personal and credit data entry interface 80 and for communicating the personal and credit data to a scanner 60 for performing a purchase transaction according to the present invention. As illustrated, the personal and/or credit data is entered into the data entry interface 80 (block 101), the data is processed (block 102) and displayed (block 103) to a user of the data entry interface 80. The personal and credit data is then transmitted to the memory device 40 (block 104) of the ring 30 positioned adjacent the ring interface 92 port of the data entry interface 80. The data is then received (block 105) and stored (block 106) in the memory device 40, and the memory device 40 can then be removed from the port and mounted into the ring 30 (block (block 107). It will be understood by those skilled in the art that the memory device 40 may not be readily removable from the ring 30, and therefore the ring 30 itself having the memory device 40 can be mounted adjacent the ring interface port 92 for transmitting data thereto.

Once the memory device 40 having the desired data is positioned in the ring 30, then the ring is placed or mounted on the user's finger (block 108) for use with purchase transactions or the like. During the purchase transaction, such as illustrated in FIGS. 1 and 6, the wearer of the ring 30 positions the ring 30 in contact with or closely adjacent the scanner 60 or wand (block 109) for communicating or transmitting personal and/or credit data from the personal identification and/or credit data file(s) 45 of the memory device 40 to the scanner 60 or wand. The scanner 60 receives the data (block 111) and preferably processes the data (block 112) for completing a purchase transaction. The data is verified (block 113), and if the data is not accurate, faulty, credit unavailable, or the like, then an indication of rejection (block 114) is shown to at least the retail store clerk. If the data is verified, then the transaction is recorded (block 115), such as verifying personal identification data or verifying credit being available to complete the transaction. If the transaction is completed, then the occurrence of the transaction and preferably the amount of the transaction and the amount of remaining credit available is transmitted back to the memory device (block 116).

As illustrated in FIGS. 1–9, and as best illustrated in FIG. 9, the present invention further includes a method of performing a purchase transaction. This method preferably includes communicating personal identification and credit data to a personal identification and credit data file 45 of a memory device 40 of a ring 30 for storage therein and positioning the ring 30 adjacent a scanner 60. The personal identification and credit data is then received by the scanner 60 from the personal identification and credit data file 45 of the memory device 40 of the ring 30. The personal identification and credit data is compared to purchase transaction data entered by the clerk C to thereby responsively determine whether to authorize the purchase transaction. This authorization on whether to proceed with the purchase transaction is preferably displayed to the clerk C or other user of the scanner 60. Additionally, a purchaser or wearer password, such as the maiden name of the purchaser's mother, for security access to the personal identification and/or credit data file 45 of the memory device 40 may also be included in the system 20 and method of the present invention. This feature advantageously assists in the prevention of theft of the ring 30 or other unauthorized use of the ring 30.

The present invention advantageously includes personal identification, credit, and/or other personal data within a ring 30, so that credit or other personal data about the wearer of the ring 30 can readily be withdrawn from the ring for completing a purchase transaction. This prevents the purchaser P or other user from having to carry other identification, credit cards, or the like to a retail store to complete a purchase of an item. The personal credit information system 20 thereby provides convenience to the wearer of the ring 30 so that fumbling through a purse or wallet for identification, credit cards, or the like is not required. The personal identification and credit information system 20 advantageously can be used to purchase items through credit or debit, for example, in combination with a checks, credit cards, or the like as a personal identification system, and/or to verify credit worthiness for completing a purchase transaction.

In the drawings and specification, there have been disclosed typical preferred embodiments of the invention, and, although specific terms are employed, these terms are used in a descriptive sense only and not for purposes of limitation. The invention has been described in considerable detail with specific reference to various illustrated embodiments. It will be apparent, however, that various modifications and changes can be made within the spirit and scope of the invention as described in the foregoing specification and defined in the appended claims.

That which is claimed:

1. A personal identification and credit information system for reducing inconveniences associated with using credit cards when a user engages in transactions, the personal identification and credit information system comprising:

a ring arranged for inserting a finger of a user therethrough, a memory device mounted to said ring, said memory device including a personal identification credit data file having personal identification and a credit data stored in a predetermined format in said personal identification and a credit data file, and means electrically connected to said memory device for communicating personal identification and credit data to and from said personal identification and credit data file of said memory device;

means arranged to be positioned adjacent said communicating means of said ring and in electrically communication therewith for receiving personal identification and credit data from said personal identification and credit data file of said memory device to thereby responsively determine whether to authorize a transaction;

wherein said ring further includes a protective cover pivotally mounted to said ring and overlying said memory device when positioned in a closed position for protecting said memory device, and wherein said protective cover includes at least one data communications port through which said communicating means of said ring communicates the personal identification and credit data from said memory device of said ring to said communication receiving means.

2. A personal identification and credit information system as defined in claim 1, wherein said memory device comprises a first memory device and wherein said communication receiving means comprises a scanner which includes:

a transducer arranged to receive communications from said memory device representative of personal identification and credit data and to responsively form electrical signals representative of the received personal identification and credit data;

a processor positioned in electrical communication with said transducer for processing the electrical signals representative of personal identification and credit data received by said transducer from said first memory device of said ring;

a second memory device positioned in electrical communication with said processor for storing data representative of a purchase transaction;

means positioned in electrical communication with said processor for comparing the personal identification and credit data to the purchase transaction data to thereby responsively determine whether to authorize the purchase transaction; and a display in electrical communication with said processor for displaying data representative of authorization of the credit transaction to a user of said scanner.

3. A personal identification and credit information system as defined in claim 1, wherein said predetermined file format includes a plurality of predetermined data fields for transferring the personal identification and credit data to said communication receiving means.

4. A personal identification and credit information system as defined in claim 1, further comprising a ring interface for transmitting the personal identification and credit data to said memory device of said ring for storage therein.

5. A personal identification and credit information system as defined in claim 4, wherein said ring interface comprises a computer, said computer including a keyboard, a processor in electrical communication with said keyboard for processing the personal identification and credit data, a third memory device in electrical communication with said processor for storing the entry of the personal identification and credit data, communicating means positioned in electrical communication with said processor and said third memory device for communicating the personal identification and credit data, and a port positioned closely adjacent said communicating means for positioning said first memory device therein so as to communicate the personal identification and credit data from said third memory device to said first memory device for storage therein.

6. A personal identification and credit information system for reducing inconveniences associated with using credit cards when a user engages in transactions, the personal identification and credit information system comprising:

a ring arranged for inserting a finger of the user therethrough, said ring including a inner surface for abuttingly contacting the finger when positioned on the finger of the user and an opposing outer surface, a storage chamber mounted to the outer surface, a first memory device mounted within said storage chamber for storing data therein, said first memory device including a personal identification and credit data file having personal identification and credit data stored in a predetermined format in said personal identification and credit data file, said predetermined format including a plurality of data fields, and a transceiver electrically connected to said memory device for receiving the personal identification and credit data to and transmitting the personal identification and credit data from said credit data file of said first memory device;

a scanner arranged to be positioned adjacent said transceiver of said ring and an electrical communication therewith for receiving personal identification and credit data from said personal identification and credit data file of said first memory device, said scanner including a transducer arranged to receive communications from said first memory device representative of personal identification and credit data and to responsively form electrical signals representative of the received personal identification and credit data, a processor positioned in electrical communication with said transducer for processing the electrical signals representative of personal identification and credit data received by said transducer from said first memory device of said ring, a second memory device positioned in electrical communication with said processor for storing data representative of a purchase transaction, a comparator positioned in electrical communication with said processor for comparing the personal identification and credit data to the purchase transaction data to thereby responsively determine whether to authorize a transaction;

wherein said ring further includes a protective cover pivotally mounted to and overlying said storage chamber when in a closed position for protecting said memory device positioned in said storage chamber, wherein said protective cover includes at least one data communications port positioned in said cover and through which said transceiver of said ring communicates the personal identification and credit data from said memory device of said ring to said scanner.

7. A personal identification and credit information system as defined in claim 6, further comprising a ring interface for transmitting the personal identification and credit data to said memory device of said ring for storage therein.

8. A personal identification and credit information system as defined in claim 7, wherein said ring interface comprises a computer, said computer including a keyboard, a processor in electrical communication with said keyboard for processing the personal identification and credit data, a third memory device in electrical communication with said processor for storing the entry of the personal identification and credit data, a transmitter position in electrical communication with said processor and said third memory device for transmitting the personal identification and credit data, and a port positioned closely adjacent said transmitter for positioning said first memory device therein so as to transmit the personal identification and credit data from said third memory device of said ring interface to said first memory device of said ring for storage therein.

9. A personal identification and credit verification ring for storing personal identification and credit data and arranged to be positioned on a finger of a user thereof, said ring comprising:

an inner surface for abuttingly contacting the finger of a user;

an opposing outer surface;

a storage chamber connected to the outer surface;

a memory device mounted within the storage chamber for storing data therein, said memory device including a personal identification and credit data file having personal identification and credit data stored in a predetermined format in said credit data file;

means electrically connected to said memory device for communicating personal identification and credit data to and from said personal identification and credit data file of said memory device; and a protective cover pivotally connected to an overlying said storage chamber when in a closed position to protect said memory device, said protective cover including at least one data communications port positioned therein through which said communicating means of said ring communicates the personal identification and credit data from said memory device of said ring.

10. A personal identification and credit verification ring as defined in claim 9, wherein said predetermined file format includes a plurality of predetermined data fields.

11. A personal identification and credit verification ring for storing personal identification and credit data and arranged to be positioned on a finger of a user thereof, said ring comprising:

an inner surface for abuttingly contacting the finger of a user;

an opposing outer surface;

a storage chamber integrally formed with the outer surface;

a memory device mounted within the storage chamber for storing data therein, said memory device including a personal identification and credit data file having personal identification and credit data stored in a predetermined format in said personal identification and credit data file, said predetermined format having a plurality of predetermined data fields;

a transceiver electrically connected to said memory device for receiving personal identification and credit data to and transmitting personal identification and credit data from said personal identification and credit data file of said memory device; and a protective cover pivotally mounted to and overlying said storage chamber when in a closed position for protecting said memory device, said protective cover including a data communications port positioned therein and positioned closely adjacent said transceiver through which said memory device of said ring receives and transmits the personal identification and credit data.

* * * * *